(12) United States Patent
Srinivasan et al.

(10) Patent No.: US 7,873,551 B2
(45) Date of Patent: Jan. 18, 2011

(54) METHOD AND APPARATUS FOR PAYMENT RETRIEVAL AND REVIEW COLLECTION

(75) Inventors: Venkataraman Srinivasan, Phoenix, AZ (US); Edward J. Shoen, Scottsdale, AZ (US); Samuel J. Shoen, Scottsdale, AZ (US); John Anthony Kestner, Tempe, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 1769 days.

(21) Appl. No.: 10/376,055

(22) Filed: Feb. 26, 2003

(65) Prior Publication Data

US 2008/0288395 A1  Nov. 20, 2008

Related U.S. Application Data

(63) Continuation-in-part of application No. 10/083,726, filed on Oct. 19, 2001, now Pat. No. 7,487,111.

(51) Int. Cl.
*G07B 17/00* (2006.01)
*G07F 19/00* (2006.01)
*G06Q 40/00* (2006.01)

(52) U.S. Cl. .......................................... 705/30; 705/39
(58) Field of Classification Search ........................ None
See application file for complete search history.

(56) References Cited

U.S. PATENT DOCUMENTS

| | | |
|---|---|---|
| 4,405,157 A | 9/1983 | Bennett |
| 5,555,496 A | 9/1996 | Tackbary et al. |
| 5,566,291 A | 10/1996 | Boulton et al. |
| 5,749,075 A | 5/1998 | Toader et al. |
| 5,774,869 A | 6/1998 | Toader |
| 5,794,207 A | 8/1998 | Walker et al. |
| 5,794,221 A | 8/1998 | Egendorf |
| 5,799,151 A | 8/1998 | Hoffer |
| 5,893,075 A | 4/1999 | Plainfield et al. |
| 5,903,880 A | 5/1999 | Biffar |
| 5,913,204 A | 6/1999 | Kelly |
| 5,948,054 A | 9/1999 | Nielsen |
| 5,950,172 A | 9/1999 | Klingman |
| 5,970,467 A | 10/1999 | Alavi |
| 6,029,141 A | 2/2000 | Bezos et al. |
| 6,049,779 A | 4/2000 | Berkson |
| 6,070,145 A | 5/2000 | Pinsely et al. |
| 6,102,287 A | 8/2000 | Matyas, Jr. |
| 6,188,994 B1 | 2/2001 | Egendorf |

(Continued)

OTHER PUBLICATIONS

Homestore.com, "Homestore.com Everything home on the Internet", 2000, p. 4, Publisher: www.Homestore.com.

(Continued)

*Primary Examiner*—F. Ryan Zeender
*Assistant Examiner*—Paul Danneman
(74) *Attorney, Agent, or Firm*—Richard E. Oney; Tiffany & Bosco, P.A.

(57) ABSTRACT

A method for conducting a review including the step of detecting a payment request from a vendor; generating a review based on the payment request; and, transmitting a reference to the review to a customer, wherein the reference provides a link to retrieve the review. A system for performing the method is also described.

29 Claims, 22 Drawing Sheets

U.S. PATENT DOCUMENTS

| | | | |
|---|---|---|---|
| 6,189,029 B1 | 2/2001 | Fuerst | |
| 6,233,564 B1 | 5/2001 | Schulze, Jr. | |
| 6,260,024 B1 | 7/2001 | Shkedy | |
| 6,260,064 B1 | 7/2001 | Kurzrok | |
| 6,269,343 B1 | 7/2001 | Pallakoff | |
| 6,317,745 B1 | 11/2001 | Thomas et al. | |
| 6,321,202 B1 | 11/2001 | Raveis, Jr. | |
| 6,332,129 B1 | 12/2001 | Walker et al. | |
| 6,341,353 B1 | 1/2002 | Herman et al. | |
| 6,351,739 B1 | 2/2002 | Egendorf | |
| 6,356,879 B2 | 3/2002 | Aggarwal et al. | |
| 6,363,357 B1 | 3/2002 | Rosenberg et al. | |
| 6,411,936 B1 | 6/2002 | Sanders | |
| 6,411,940 B1 | 6/2002 | Egendorf | |
| 6,421,724 B1 | 7/2002 | Nickerson et al. | |
| 6,431,985 B1 | 8/2002 | Kim | |
| 6,446,044 B1 | 9/2002 | Luth et al. | |
| 6,466,914 B2 | 10/2002 | Mitsuoka et al. | |
| 6,477,504 B1 | 11/2002 | Hamlin et al. | |
| 6,477,509 B1 | 11/2002 | Hammons et al. | |
| 6,490,567 B1 | 12/2002 | Gregory | |
| 6,865,559 B2 | 3/2005 | Dutta | |
| 6,970,837 B1 | 11/2005 | Walker et al. | |
| 7,003,497 B2 | 2/2006 | Maes | |
| 7,117,166 B2 | 10/2006 | Ifflander et al. | |
| 2001/0005829 A1* | 6/2001 | Raveis, Jr. | 705/1 |
| 2001/0037230 A1* | 11/2001 | Raveis et al. | 705/9 |
| 2001/0047280 A1 | 11/2001 | Alexander et al. | |
| 2002/0035488 A1* | 3/2002 | Aquila et al. | 705/4 |
| 2002/0087461 A1* | 7/2002 | Ganesan et al. | 705/39 |
| 2002/0152162 A1 | 10/2002 | Eda et al. | |

OTHER PUBLICATIONS

PR Newswire, NY, "Travelscape.coms Web Site Earns Top Marks from 2 Independent Rating Organizations", Jan. 4, 2000, p. 2, Publisher: ProQuest # 47640831.

Rhonda L. Rundle, "Homestore.com Starts Venture That Lets Consumers Buy Moving Services Online", Sep. 19, 2000, p. 3, Publisher: Wall Street Journal.

Diehl, Michelle, "Home service provider networked with web site", "Proquest #48272980", Jan. 23, 2000, p. 3, Publisher: Richmond Time Dispatch.

Gilgoff, Henry, "It's your money, . . . ", "Proquest #44830127", May 10, 1998, p. 4, Publisher: Newsday.

Http://www.Homestore.com/Moving, "#1 House and Home Network", Oct. 2001, p. 3, Publisher: www.homestore.com.

Meno:, "Directmoving.com announces its launch into the Middle East", "Proquest #95538865", Aug. 26, 2000, p. 2.

Http://www.Moving.com, "Moving.com: Find moving companies, real estate agents, mortgage companies & more", Oct. 2001, p. 3, Publisher: www.moving.com.

* cited by examiner

What do you need help with?

Get Moving Help

Service Provider — *Moving Help*™

1. What do you need help with?
2. Select your Service Provider
3. Legalese
4. Where do you want help?
5. Submit your request Frequently asked questions Feedback Sign out Services available in Grafton, ND ☑ Load or Unload Help ☐ Driving Help (Customer provides truck)

Date when needed

December ▼  25 ▼  2002 ▼

December ▼  25 ▼  2002 ▼

Copyright 2001 eMove, Inc. All Rights Reserved. Unless otherwise noted, all trademarks, servicemarks, brandnames and logos used on this web site are the sole property of U-Haul International, Inc. and are under a grant of license or permission for use by eMove, Inc. All others are the property of their respective owners.

FIG. 7b

FIG. 7c eMove   — ☐ ✕

Moving Help Service Provider

Important legal information

Please review the terms and conditions below:

1. This website functions as a neutral marketplace (like eBay) to connect you and the various service providers. We do not endorse any services or Service Provider.
2. The transaction and any resulting provision of services are solely between you and the Service Provider. Moving Help is not responsible for any damages or losses incurred.
3. Upon the completion of services, you agree to present the Payment Code to the Service Provider.

Please read the user agreement for a complete explanation of all terms and conditions.

I want to go back and change Service Providers.

Get Moving Help

1. *What do you need help with?*
2. *Select your Service Provider*
3. Legalese
4. *Where do you want help?*
5. *Submit your request*

Frequently asked questions

Feedback

Sign out

Copyright 2001 eMove, Inc. All Rights Reserved. Unless otherwise noted, all trademarks, servicemarks, brandnames and logos used on this web site are the sole property of U-Haul International, Inc. and are under a grant of license or permission for use by eMove, Inc. All others are the property of their respective owners.

FIG. 7f eMove

Your jobs

Moving Help
Service Provider

Jane's Help

Your jobs

Your profile:
preview | change

Your account:
active | deactivate

Sign out

Frequently asked
questions

Service Provider
agreement

Service Provider
education

Contact us

New work requests

These are services that customers have requested of you. If you accept a job, it will be scheduled and you will be given more details. If you do not accept it within 24 hours, it will be counted as a rejection. Rejecting too many jobs will result in bad karma!

| # | Service | Where | When | Customer notes | Accept | Reject |
|---|---------|-------|------|----------------|--------|--------|
| 47690 | Load or Unload Help<br>2-man crew - we can do the whole load/unload for you! | Grafton, ND<br>12345 | 3 hours on<br>12/25/02 | Move furniture and boxes.<br>(23 hours left) | | |

Scheduled jobs

These are jobs that you have committed to. When you have finished a job, view it and enter the Payment Code that the customer gave you to get paid.

| # | Service | Where | When | Customer notes | |
|---|---------|-------|------|----------------|---|
| 47587 | Load or Unload Help<br>1-person to assist you on your move. If you need just an extra pair of hands and a strong back! | Grafton, ND<br>12345 | 2 hours on<br>12/27/02 | Move a Piano | View |

Completed jobs

Feedback

Your current rating: ★★★★★ 5.0 (1 comment)
View comments...

Copyright 2001 eMove, Inc. All Rights Reserved. Unless otherwise noted, all trademarks, servicemarks, brandnames and logos used on this web site are the sole property of U-Haul International, Inc. and are under a grant of license or permission for use by eMove, Inc. All others are the property of their respective owners.

FIG. 8b

FIG. 8c eMove

Your jobs

New work requests

These are services that customers have requested of you. If you accept a job, it will be scheduled and you will be given more details. If you do not accept it within 24 hours, it will be counted as a rejection. Rejecting too many jobs will result in bad karma!

(none)

Scheduled jobs

These are jobs that you have committed to. When you have finished a job, view it and enter the Payment Code that the customer gave you to get paid.

| # | Service | Where | When | Customer notes | |
|---|---------|-------|------|----------------|---|
| 47690 | Load or Unload Help<br>2-man crew - we can do the whole load/unload for you! | Grafton, ND<br>12345 | 3 hours on<br>12/25/02 | Move furniture and boxes. | View |
| 47587 | Load or Unload Help<br>1-person to assist you on your move. If you need just an extra pair of hands and a strong back! | Grafton, ND<br>12345 | 2 hours on<br>12/27/02 | Move a Piano | View |

Completed jobs

Feedback

Your current rating: ★★★★★ 5.0 (1 comment)
View comments...

---

Jane's Help

Your jobs

Your profile:
preview | change

Your account:
active | deactivate

Sign out

Frequently asked questions

Service Provider agreement

Service Provider education

Contact us

Copyright 2001 eMove, Inc. All Rights Reserved. Unless otherwise noted, all trademarks, servicemarks, brandnames and logos used on this web site are the sole property of U-Haul International, Inc. and are under a grant of license or permission for use by eMove, Inc. All others are the property of their respective owners.

METHOD AND APPARATUS FOR PAYMENT RETRIEVAL AND REVIEW COLLECTION

CROSS-REFERENCE INFORMATION

The present invention is a continuation-in-part of patent application Ser. No. 10/083,726, entitled "An Online Marketplace For Moving and Relocation Services," filed on Oct. 19, 2001, and now issued as U.S. Pat. No. 7,487,111 B2, the contents of which is fully incorporated by reference herein.

FIELD OF THE INVENTION

The present invention relates generally to a payment and review system for an online marketplace in a computer network environment, and more particularly, to a system for payment retrieval by vendors for rendered services and review of customers who received the services.

BACKGROUND OF THE INVENTION

Typically, a customer pays for service after the service is rendered. For example, a service provider such as a mover, a handyman, a plumber or an electrician will provide service for a customer at the customer's location. At the completion of the service, or job, the customer will pay the service provider, also referred to herein as a vendor. The basic service and payment transaction is straightforward. However, as the transaction is completed as soon as the customer pays the vendor, there should be further incentive for either party to engage in further communications. Typically, unless a customer has received either extremely good or extremely poor service from the vendor, that customer has little motivation to provide feedback about the services the customer received from the vendor.

Although feedback from customers is important for vendors, who use it to improve their services, having customer feedback is especially important in online marketplaces, where customers can select from a variety of vendors. The online marketplace is typically operated by a third party (i.e., an entity other than the vendor or customer), who receives a fee for each transaction between a customer and a vendor. The more transactions that occur in the marketplace, the more fees the third party receives. In order to continue to build goodwill with customers, the operator of the online marketplace would like to provide a system through which any customer that uses the marketplace can help to ensure himself/herself to have a good experience in that the vendor chosen by the customer provides an expected level of service.

One method for matching customer expectation with vendor capabilities is to implement a feedback system on the online marketplace where a customer can evaluate a particular vendor by reviewing feedback from the previous customers of the vendor. For example, in the case of emove.com, which is website operated by eMove, Inc. that provides an online marketplace for moving services, a vendor can be evaluated by the feedback provided by its previous customers. The feedback occurs after the vendor has provided the services.

As the customer who is moving is typically more concerned about the actual move, where a multitude of tasks need to be completed, than filling out reviews, providing a mechanism to facilitate feedback submission is a challenge. Most likely, if the customer has a computer, it is inaccessible as it is being moved itself, dramatically reducing the likelihood of the customer providing feedback for a vendor that has provided services as it requires the customer to seek out Internet access. Moreover, requiring a customer to "login" by remembering usernames or passwords assigned before the move when returning to the online marketplace to respond to a review after the move adds an additional layer of complication that makes the review process inconvenient to complete.

Conversely, vendors are interested in being paid for their services as soon as they have provided them, in addition to receiving feedback from customers. Vendors also want to ensure that any reviews provided for their services are based on actual work they have performed and completed, with an emphasis on receiving feedback as soon as the work is completed.

Accordingly, there is a need for a system that can provide payment to vendors and obtain feedback from customers with a minimal amount of effort by all parties involved.

SUMMARY OF THE PREFERRED EMBODIMENTS

In one preferred embodiment of the present invention, a method is provided that allows a vendor to retrieve payment for services rendered while simultaneously transmitting an e-mail message to the customer with a link to a review. In one embodiment, the method includes detecting a payment request from a vendor; generating a review based on the payment request; and, transmitting a reference to the review to a customer, wherein the reference provides a link to retrieve the review.

In another embodiment of the present invention, a computer readable medium having a computer readable program code contained therein for conducting a review includes computer readable program code for detecting a payment request from a vendor. The computer readable medium also includes computer readable program code for generating a review based on the payment request; and, computer readable program code for transmitting a reference to the review to a customer, wherein the reference provides a link to retrieve the review.

In another embodiment, the present invention is implemented in a review system having a processor and a memory coupled to the processor. The memory includes a vendor application and a customer application, wherein the vendor application is configured to receive a payment request from a vendor, and the customer application is configured to generate a review based on the payment request and transmit a reference to the review to a customer Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIGS. 7a-7g are screen shots of a user interface for the customer to place service requests.

FIGS. 8a-8d are screen shots of a user interface for the vendor to access the vendor's account.

FIGS. 10a-10b are screen shots of a user interface for the customer retrieving the review.

Like numerals refer to like parts throughout the several views of the drawings.

DETAILED DESCRIPTION OF THE PREFERRED EMBODIMENTS

The present invention provides a mechanism in a online marketplace for a service provider ("vendor"), who has provided service to a customer that has pre-paid for those services, to retrieve those funds from an "escrow" account. The vendor retrieves the funds based on a payment code that the customer gives to the vendor upon completion of the provision of the services. Once the payment code is entered, the vendor is paid and, simultaneously, the customer is e-mailed a link to a review form to provide feedback for the vendor. In one embodiment of the present invention, the link is a Universal Resource Locator (URL) to a web page on a website such as emove.com. When the customer clicks on the web page link in the review form, the customer will be taken to the website where the customer can provide feedback about the vendor (without having to first login to the website). Once the customer has submitted feedback, the customer will be credited with a refund of transaction fees charged by the online marketplace.

Figure 1:
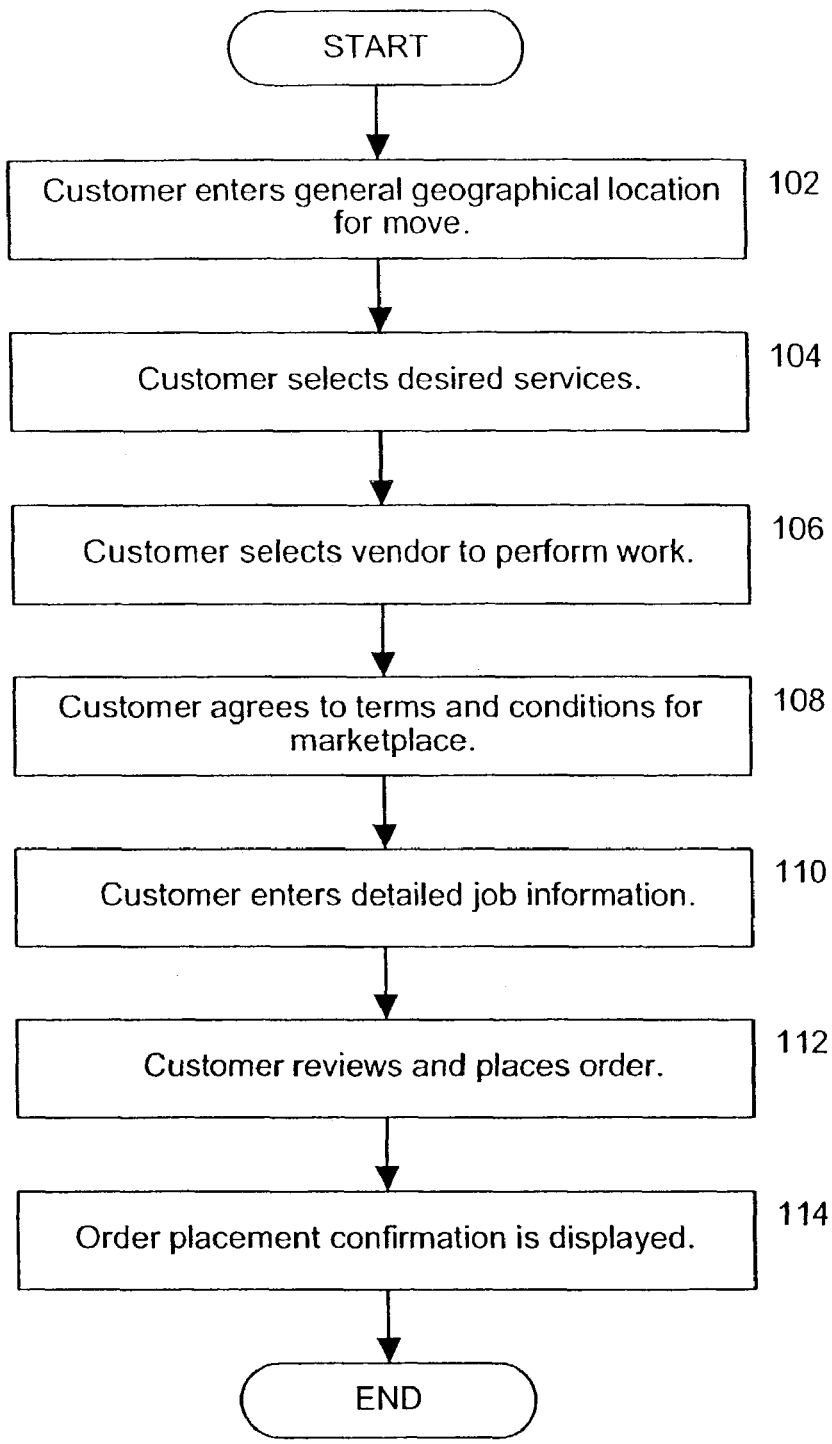
FIG. 1 is a flow diagram illustrating the process of a customer ordering services using an online marketplace in accordance with one embodiment of the present invention.

FIG. 1 is a flow chart illustrating the process for a customer to request service be provided by a vendor, in accordance with one embodiment of the present invention. The provision of the service is referred to as a "job" generally. In the presented example, the customer desires to contract for moving services to move furniture and boxes at a location in Grafton, N. Dak. As will be apparent from the description contained herein, the system in the example applies to other types of services, whether or not they are related to moving services. For example, services including, but not limited to, plumbing services, painting services, cleaning services, and gardening services, may be contracted for using the system.

Figure 7A:

In step 102, the customer enters the general geographical area(s) where the service, or job, is to be performed. The system uses this information to select from a list of vendors that provide services in the entered geographical area(s) to be displayed, as discussed below. FIG. 7a is a window displaying that the customer has entered "Grafton" in the "City:" field, and "ND" in the "State:" field, in the "Moving From:" section, indicating that the customer is requesting moving services only within the Grafton, N. Dak. region. The customer proceeds to the next step by clicking on the "LET'S GET STARTED" button, and operation continues with step 104.

In step 104, the customer enters the date on which the service is to be provided, and the type(s) of service desired. FIG. 7b illustrates two services typically associated with moving help: loading/unloading help and driving help. In one embodiment, the services listed are based on previously defined categories of services. In another embodiment, the services listed include all the services offered by the vendors in the general geographical area previously entered by the customer. The customer can then proceed to the next step of the process as shown in FIG. 7b and subsequent figures by clicking on the "NEXT STEP" button.

Figure 7C:
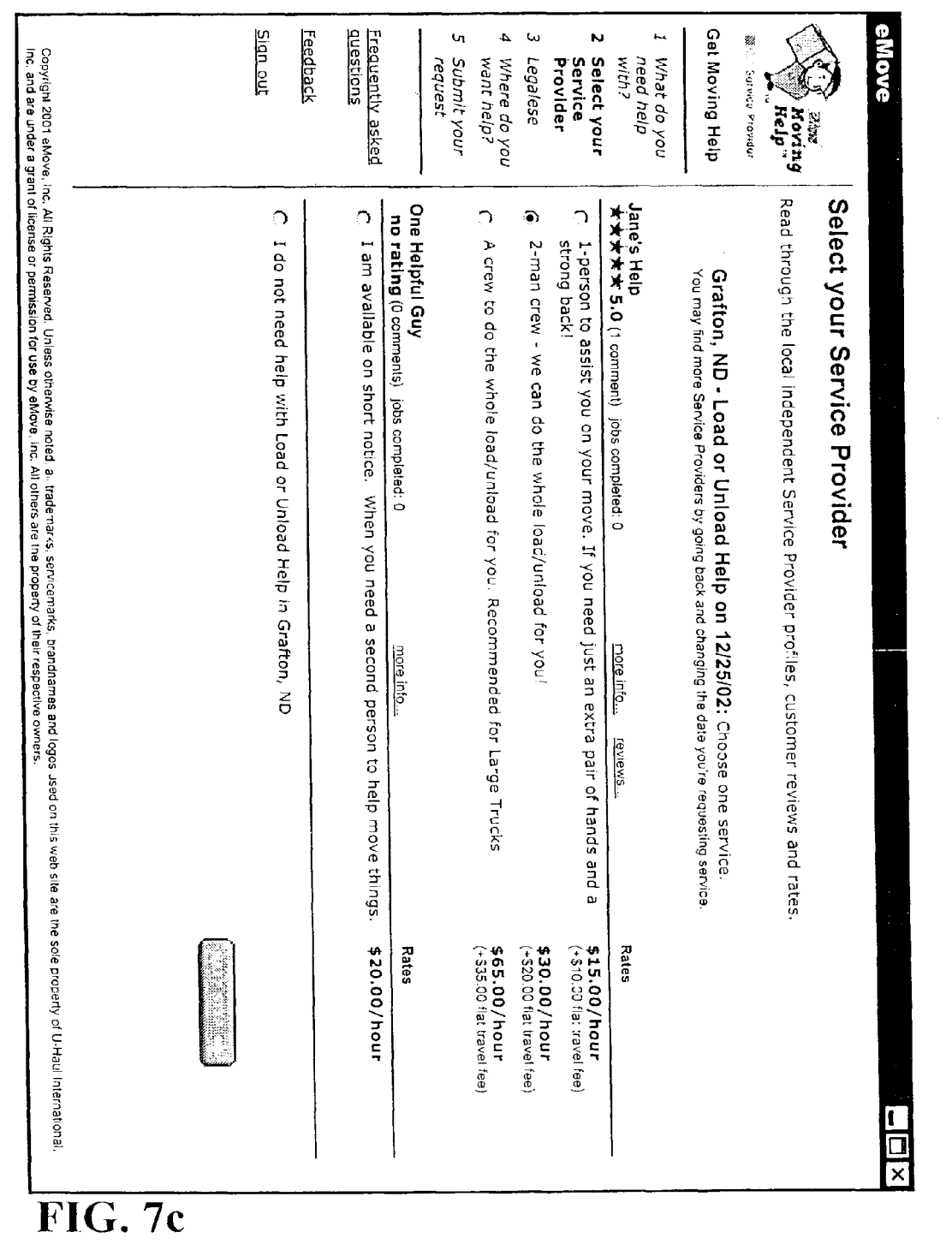

In step 106, the system displays the vendors matched by the system that provide loading/unloading service in the Grafton, N. Dak. area. FIG. 7c illustrates a window that lists two service providers: "Jane's Help" and "One Helpful Guy", with rating information based on evaluations that have been previously submitted by other customers. The customer may receive more information by selecting the "more info . . . " link, and read the received reviews for each vendor by selecting the "reviews . . . " link for the appropriate vendor. In the example shown in FIG. 7c, the customer has selected "Jane's Help" as the vendor to which the customer wishes to submit a request for moving help.

In step 108, the customer is presented with a legal agreement outlining the terms and conditions under which access to the system is being provided for the customer to engage the services of the vendor. In another embodiment, the terms and conditions may also include the terms and condition for the selected vendor. FIG. 7d illustrates a window with a summary of the terms and condition for emove.com, with a "user agreement" link for the customer to retrieve a detailed version of the terms and conditions. Operation continues with step 110 when the customer clicks on the "I AGREE" button.

Figure 7E:
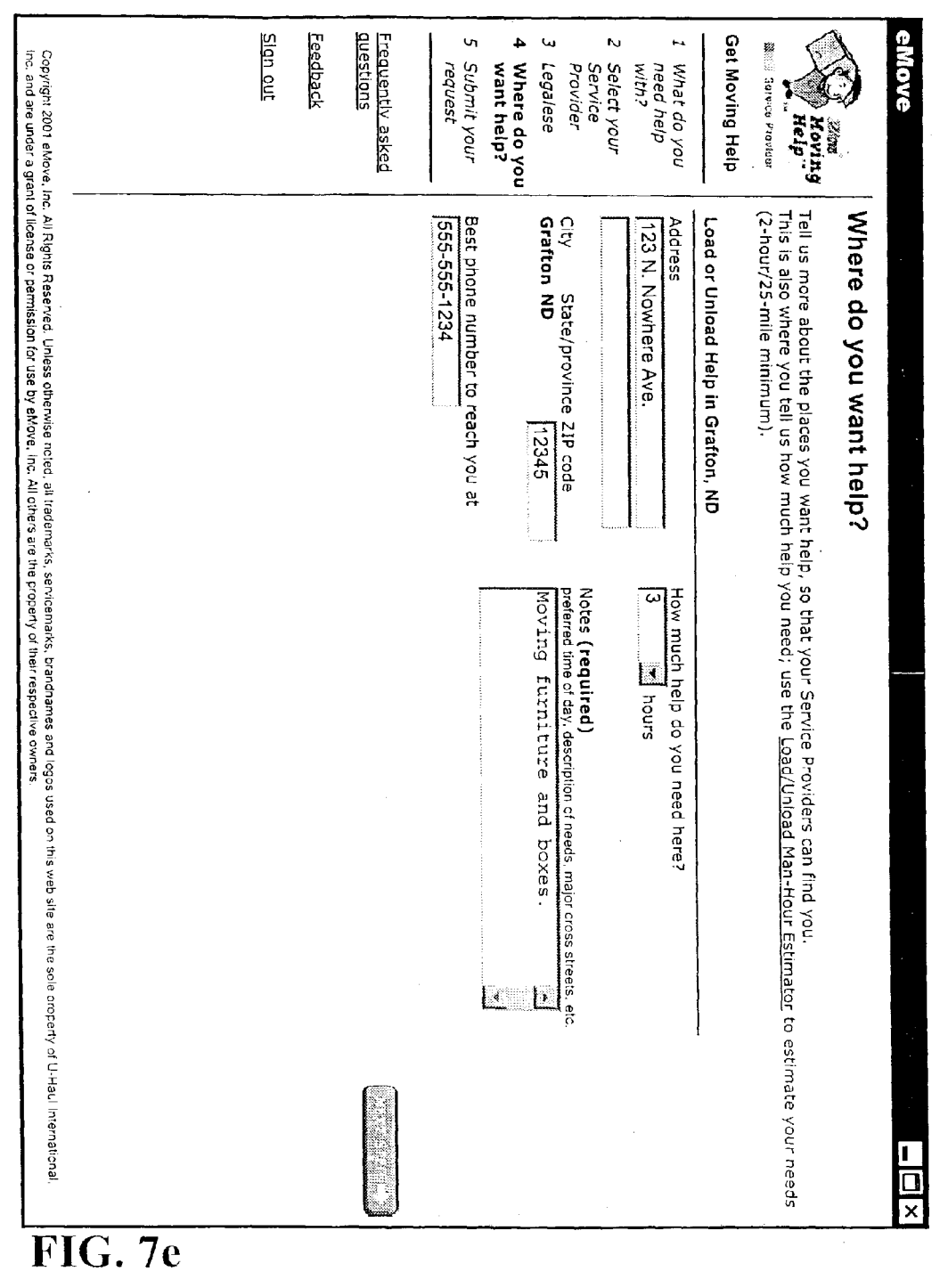

In step 110, the customer enters detailed job information, including the specific address where the service is to be provided, including the zip code; a phone number; the number of hours of service desired; and an elaboration of the service being requested. The customer may also provide other details, including but not limited to a preferred time of day for the provision of the service; major cross-street of the location; and other special needs or information. FIG. 7e illustrates an exemplary window where the customer has entered the address of "123 N. Nowhere Ave."; a zip code of "12345"; a phone number of "555-555-1234"; a description of "Moving furniture and boxes"; and a desired time period of "3" hours.

Figure 7F:
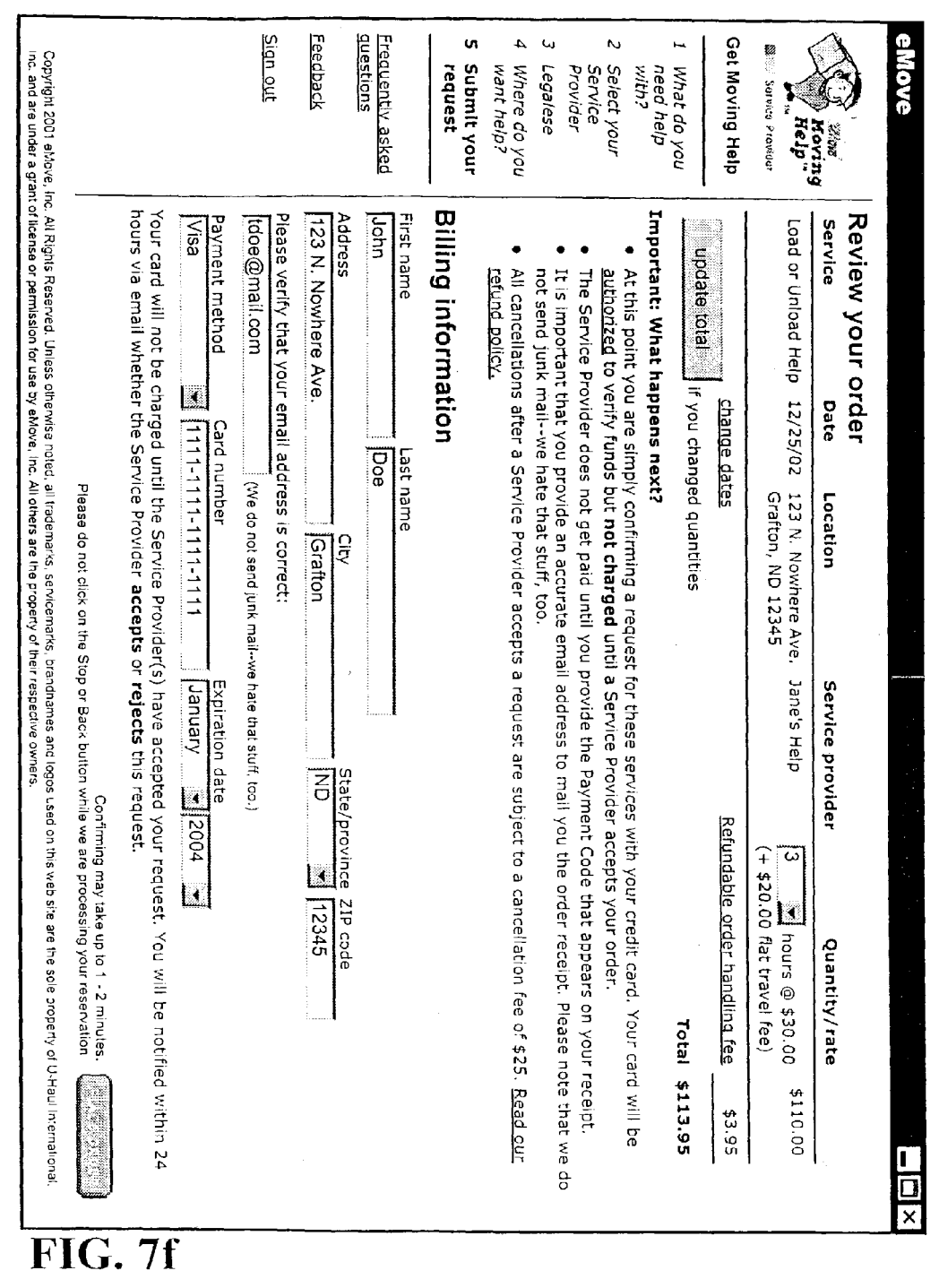

In step 112, the customer is presented with a summary of the order to verify the details of the job and also requested to enter billing information. FIG. 7f illustrates a window where the customer has entered his name ("John Doe"); address ("123 N. Nowhere Ave., Grafton, N. Dak., 12345"; e-mail address ("jdoe@mail.com"); payment ("Visa"); card number ("1111-1111-1111-1111"); and expiration date of the credit card ("January 2004"). The customer places the order by clicking on the "PLACE ORDER" button. The sequence contained in steps 102 to 112 illustrates one way for the system to receive a job request from a customer. For example, more or less information may be requested by the system depending on whether more or less screens, respectively, is presented to the customer.

Figure 7G:

In step 114, the system presents the customer with a confirmation of the job request and other pertinent information, including instructions to provide the vendor with a payment code that will allow the vendor to retrieve remuneration, as described below, once the job has been completed. In addition, the vendor is contacted with notification that a new job request has been received for the vendor's services. For example, an e-mail informing the vendor that a new job request for the vendor's services has been received may be sent to the vendor. FIG. 7g illustrates a sample confirmation window, displaying the payment code and the payment mechanism with which the customer will be charged when the vendor accepts the job request. In another embodiment, the customer is not presented with a payment code nor is the customer charged any fees until the vendor has accepted the job request. In yet another embodiment, the customer may be charged a fee as a deposit before the job request is presented to the selected vendor.

The contents of an exemplary e-mail that may be sent to a vendor notifying the vendor of a job request is as follows:

```
To: jane@jmh.com
From: serviceprovider@emove.com
Subject: You have an eMove job. Respond within 24
hours.
Body:
    A customer has requested service from you.
Job # 47690
Load or Unload Help
2-man crew - we can do the whole load/unload for you!
Where & When:
Grafton, ND 12345
3 hour on Wednesday, December 25, 2002
Customer notes:
Move furniture and boxes.
    Accept this job:
http://serviceprovider.emove.com/acceptjob?id=47690&vi
d=232&email=jane@jmh.com
    Reject this job:
http://serviceprovider.emove.com/rejectjob?id=47690&vi
d=232&email=jane@jmh.com
... or go to http://www.emove.com/serviceprovider and
choose to either accept or reject this job. If you
accept this job, it will be scheduled and you will be
given more details. If you do not accept it within 24
hours, it will be counted as a rejection. Rejecting
too many jobs will result in bad karma!
Regards,
    eMove Moving Help
End
```

As shown in the text above, the e-mail is sent to the vendor from emove.com, with links for the vendor to accept ("http://serviceprovider.emove.com/acceptjob?id=47690&vid=232&email=jane@jmh.com") or reject ("http://serviceprovider.emove.com/rejectjob?id=47690&vid=232&email=jane@jmh.com") the job request without having to login to the emove.com website. As suggested in the text of the e-mail, and as described below, the vendor may also view and accept the job on the website once the vendor accesses the vendor's account.

Figure 2:
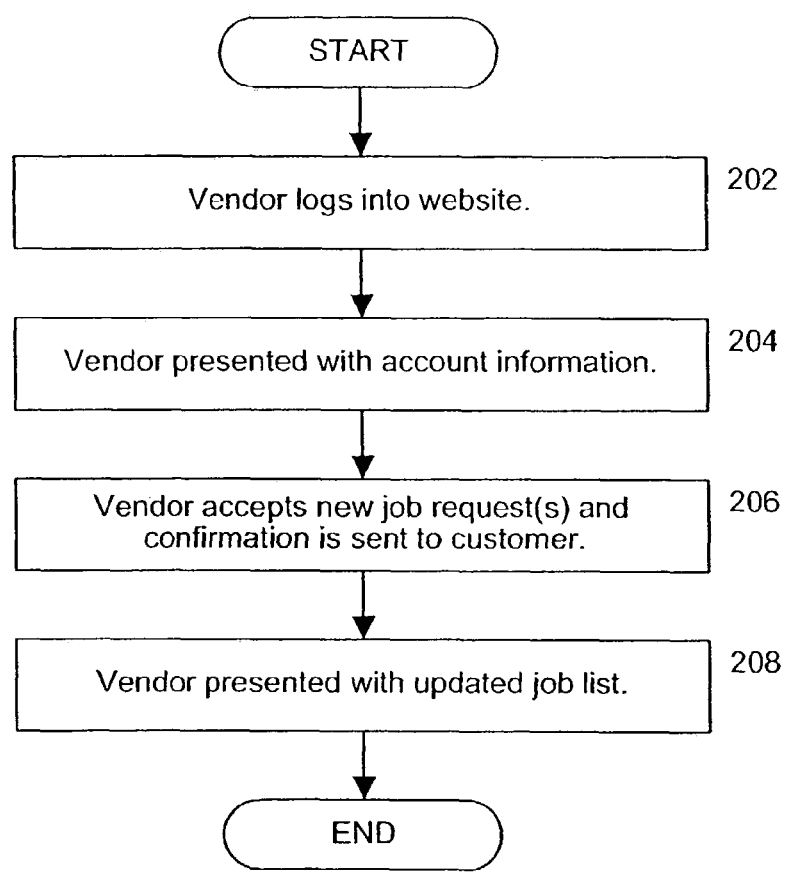
FIG. 2 is a flow diagram illustrating the process of a vendor accessing and retrieving job information using the online marketplace in accordance with one embodiment of the present invention.

FIG. 2 is a flow chart illustrating the process for the vendor to access the vendor's account and retrieve job information, including accepting or denying new job requests, viewing currently scheduled jobs, viewing the vendor's ratings, or requesting payment for completed jobs, according to one embodiment of the present invention.

Figure 8A:

In step 202, the vendor logs onto the website. FIG. 8a illustrates a window where the vender provides his login information, including a user identifier ("Email address") and a password ("Password"), and submits that information for validation to enter the site by clicking on the "SIGN IN" button. If a vendor has not previously signed-up as a service provider for emove.com, then the vendor can select the "Sign up for an account" link to create a new account.

In step 204, the vendor has successfully logged onto the website and is presented with the vendor's account information. FIG. 8b illustrates the window that is displayed to the vendor after the vendor has logged in. The display includes any new job requests the vendor has received ("New work requests"), which in this case is job #47690; any scheduled jobs to which the vendor has agreed to provide service (e.g., job #47587), and a link to a list of jobs that the vendor has completed ("Completed jobs"). The display also provides a summary of each of the jobs.

The display shown in FIG. 8b also includes a summary of the vendor's current rating based on comments and feedback received from customers for which the vendor has previously provided services, including a graphic that displays the numerical summary rating using stars. In the example, as part of a customer's feedback, the customer may award a vendor a numerical rating ranging from "1" to "5," with a rating of 1 being the worst rating and the rating of 5 being the best rating. The system will use an average of the numerical ratings of all customer responses to produce the number shown in the display. A link to the list of comments is also shown ("View comments . . . ").

Continuing to refer to FIG. 8b, and specifically the "New work requests" section listing a new job #47690 that was previously entered by the customer, the vendor can choose to accept or deny the new job request by clicking on the "Accept" or "Reject" buttons, respectively. If the vendor accepts the job request, the customer is sent an e-mail. If the vendor rejects the job request, the customer will receive an e-mail with a message that the vendor has rejected the service request. The customer may then be provided with a link in the e-mail to go directly to the service provider selection page—i.e., FIG. 7c, to choose a new vendor to whom the customer will submit a service request.

The contents of an exemplary e-mail sent to the customer when the vendor accepts the job request is as follows:

```
To: jdoe@mail.com
From: movinghelp@emove.com
Subject: Load or Unload Help for 12/25/02 has been
accepted
Body:
***********************************************
Please do not reply directly to this message - use the
contact information below.
***********************************************
Dear John,
    Jane's Help is happy to accept your request for
Load or Unload Help on Wednesday, December 25, 2002.
    Please note that you have now pre-paid for 3
hours of our service and eMove has charged $110.00 on
your card for this job. We look forward to discussing
your needs in more detail. If you do not hear from us
within 24 hours, please call us at the phone number
below.
    After the service is completed to your
satisfaction, we will need the Payment Code that
appears below from you to make sure we are paid for
this work.
    ---------------------------
    *** Payment Code: 818826 ***
    ---------------------------
Critical Information:
    - Do not give the Payment Code out until after
the job is completed.
    - There will be no need to pay with cash or
check, unless you exceed the amount of pre-paid
```

-continued

```
     service.
         - If you have further questions about the Moving
     Help process, please go to
     http://www.emove.com/mh/faq.html
         - Questions that we can't answer should be
     directed to customersupport@emove.com (include the job
     number, which is #47690)
         Thanks for choosing us as your service provider.
     We look forward to serving you.
     Regards,
         Jane Juniper
         Jane's Moving Help
     Contact info:
         Phone: 555-555-4321
         Email: jane@jmh.com
     *** This email has been sent to you from eMove Moving
     Help on behalf of Jane's Help. ***
     End
```

As shown in the text above, the e-mail is sent to the customer from emove.com on behalf of the vendor, with contact information for the vendor listed at the end of the e-mail, which allows vendors that do not have electronic mail capabilities to provide services as the system sends the e-mails for coordinating the transaction. In this case, however, the vendor is contactable by e-mail.

The e-mail also notifies the customer that the customer has now pre-paid for the services as a vendor has accepted the job request. The funds are held in escrow pending completion of the scheduled job, and will be retrieved by the vendor using the payment code as described herein. Thus, practically, the customer has prepaid for the services, with the funds provided by the customer being held by emove.com until proof of the being completed is received.

Figure 8C:
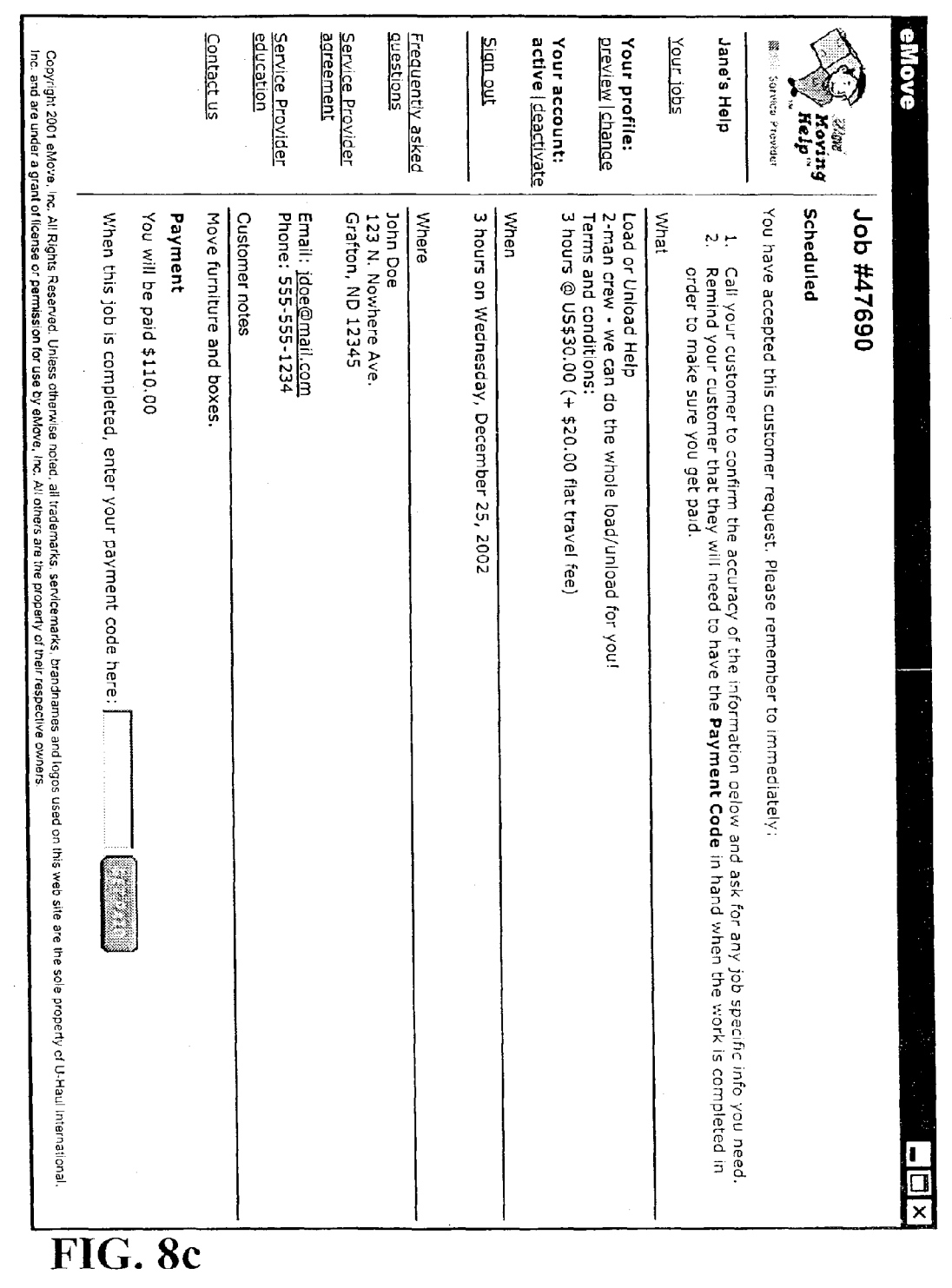

Returning to FIG. 2, in step 206, the vendor accepts the new job request for job #47690 and is presented with a confirmation of the job being scheduled for performance by the vendor. FIG. 8c illustrates an exemplary window displayed to the vendor listing the details of job #47690, which contains information previously entered by the customer—i.e., FIGS. 7a-7g. As further discussed herein, this display is also where the vendor will enter the payment code provided by the customer once the vendor has performed the services for which the vendor is contracted.

In optional step 208, the vendor is presented with an updated account display with the now accepted job request for job #47690 being listed under the "Scheduled jobs" section. FIG. 8d illustrates the updated account display for the vendor. Listed along each job is a link to the detailed information for the job ("View"), which the vendor can access to retrieved detailed information—such as the one shown in FIG. 8c.

Upon the scheduled day(s) of the service, the vendor performs the contracted for service and, upon completion of the job, the customer provides the vendor with the payment code. In this example, as contained in the above e-mail, the payment code is "818826." Once the vendor receives the payment code from the customer, remuneration may be retrieved by the vendor by going to the emove.com website. As described below, the present invention provides for "simultaneous" payment retrieval by the vendor and transmittal of a review request to the customer.

Figure 3:
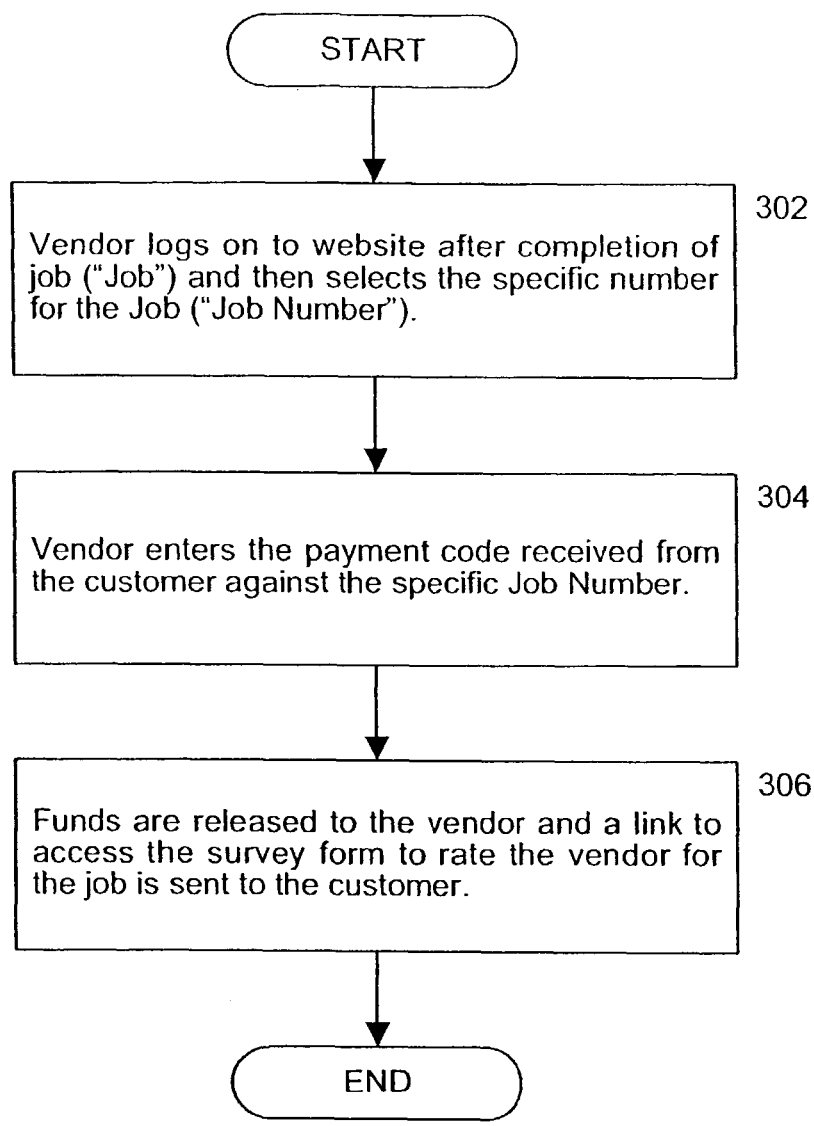
FIG. 3 is a flow diagram illustrating the process of the vendor retrieving payment using the online marketplace after providing services to the customer in accordance with one embodiment of the present invention.

FIG. 3 is a flow chart illustrating the process for payment retrieval by the vendor and transmission of the link to the review being sent to the customer in accordance with one embodiment of the present invention. As described, this process occurs when the vendor has completed the job for the user and the user has provided the vendor with a payment code. The vendor is then ready to retrieve the funds associated with the payment code.

In step 302, the vendor logs onto the website and selects the job for which the vendor desires to receive remuneration by selecting on the "View" link for the appropriate job (e.g., job #47690) in FIG. 8d. The login process is described above in relation to FIG. 8a and the display of the (scheduled) jobs for which the vendor may enter payment is described above in relation to FIGS. 8b and 8c.

Figure 9A:
FIGS. 9a-9b are screen shots of a user interface for the vendor retrieving payment for the vendor's services.

Once the vendor has navigated to the job detail screen as shown in FIG. 8c, the vendor may enter the payment code and then clicks on the "GET PAID" button to submit the code. In FIG. 9a, the vendor has entered the payment code ("818826").

Figure 9B:

In step 306, once the payment code is verified, the system transfers the funds to the vendor. As shown in FIG. 9b, the vendor has previously indicated that the preferred payment method for the vendor is an electronic payment system provided by PayPal, Inc. In addition, as further detailed below, the system transmits a link to a review request for the job to the customer in an e-mail.

Figure 4:
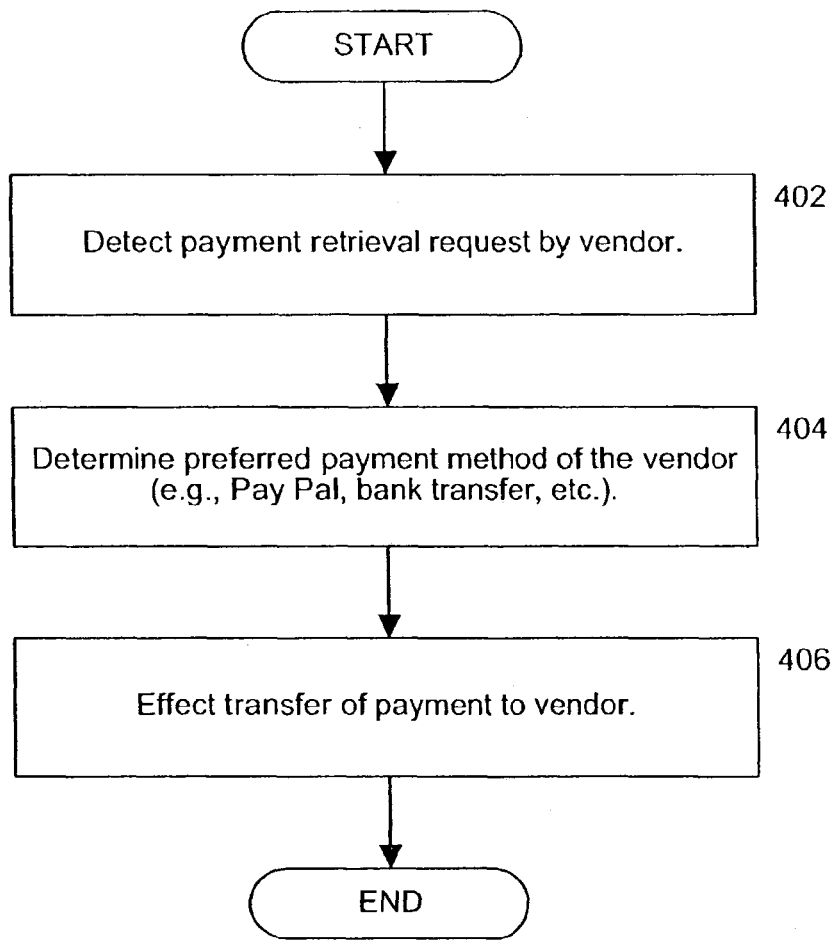
FIG. 4 is a flow diagram illustrating the process of the online marketplace effecting a payment to the vendor in accordance with one embodiment of the present invention.

FIG. 4 illustrates the process under which the vendor is sent payment in accordance with one embodiment of the present invention, where, in step 402, the system detects that the vendor is requesting payment based on the submission of the payment code. In step 404, the system determines the preferred payment method as previously selected by the vendor, which may include, but is not limited to, electronic payment systems such as PayPal, Inc.; electronic fund transfers to the vendor's bank account; or a payment to a credit card account of the vendor. It is to be noted that the payment may be made in a variety of mechanisms. Once the payment mechanism has been determined, the system effects payment in step 406.

Figure 5:
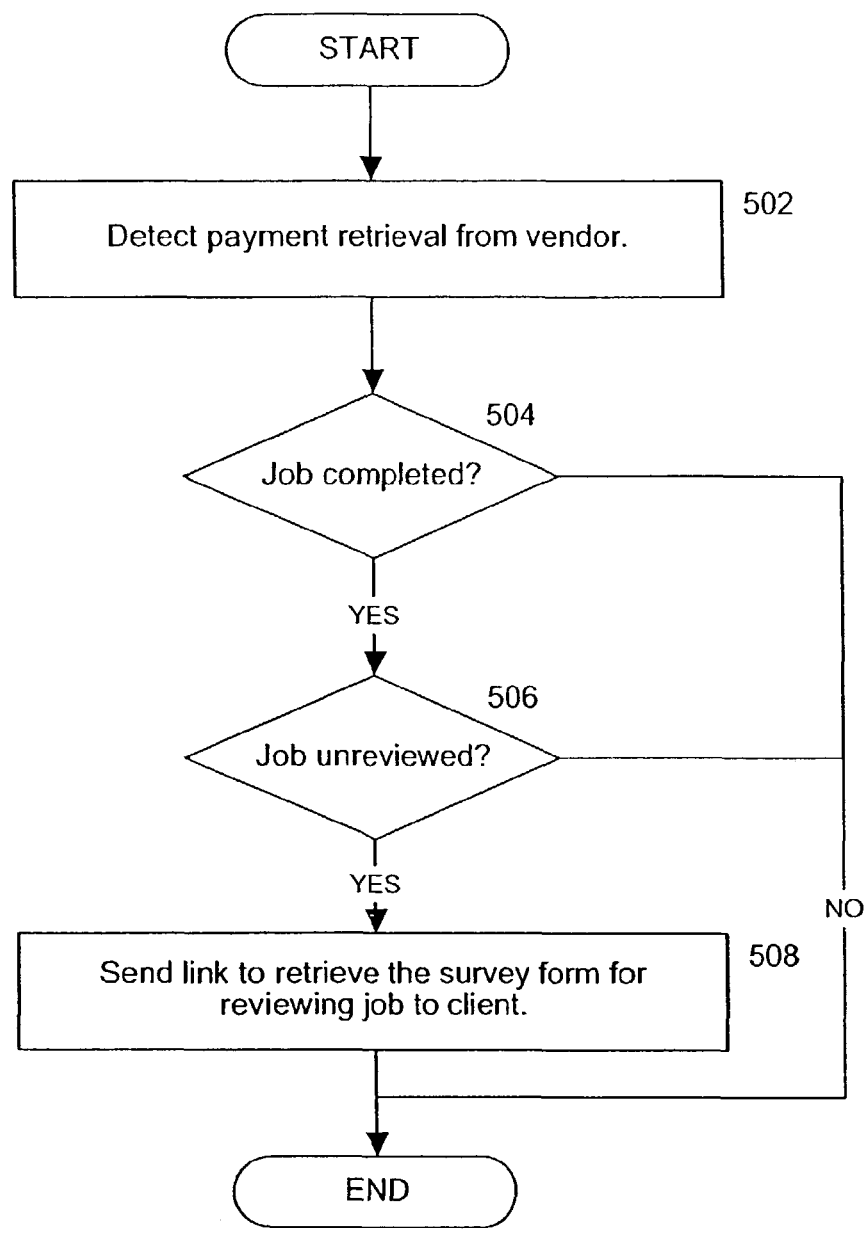
FIG. 5 is a flow diagram illustrating the process of the online marketplace sending out a message to the customer with a link to a review in accordance with one embodiment of the present invention.

FIG. 5 is a flow chart illustrating the process of the system sending an e-mail to the customer once the vendor has requested payment in accordance with one embodiment of the present invention, where, starting in step 502, it is detected that the vendor has retrieved payment using the payment code for the job. In step 504, it is determined whether the job has been completed, and operation proceeds with step 506 if the job has been completed. In step 506, it is determined whether the job is unreviewed, and operation proceeds with step 508 if the job has not been reviewed. If it is determined that the job is not completed (step 504) or if it is determined that a review has already been submitted for the job associated with the payment code (step 506), operation will end and no message will be sent to the customer.

In step 508, if the job is completed and no review has been submitted for the job, then, in the preferred embodiment, the system will construct and transmit an e-mail to the customer with a link to a review for reviewing the vendor with respect to the particular job. The system checks for these conditions to prevent a customer from completing a review if the customer has already submitted a review for the job; or if the job has not been "completed," with the definition of a job being completed being equated to the vendor retrieving payment. In another embodiment, the review may be sent to the customer in the body of the e-mail, in which case the e-mail contains code that allow an e-mail reader program to retrieve and display the review automatically. For example, the e-mail may contain hypertext markup language (HTML) code that references and displays the review. As defined by the present invention, there is no distinction made between code that "references" the review and code that displays the review. Thus, the code for the link to the review could include the code to display the review itself, such that there would be no need to retrieve any further data from the system to display the review.

The contents of an exemplary e-mail message sent to the customer from emove.com is shown below:

---

To: jdoe@mail.com
From: movinghelp@emove.com
Subject: Get an eMove automatic refund - your comments wanted!
Body:
    Thank you for using eMove Moving Help. Your Service Provider has been paid.
    Moving families want to hear about your Load or Unload Help experience with Jane's Help. The transaction fee of $3.95 will automatically be refunded to your credit card upon your rating. It takes only 30 seconds!
    To rate Jane's Help, click on the link below or cut and paste it into your Web browser:
    http://movinghelp.emove.com/ratejob?cid=90542-12345&email=jdoe@mail.com&id=47690
    To view a receipt of your Moving Help order, go to:
http://movinghelp.emove.com/receipt?cid=90542-12345&email=jdoe@mail.com&id=90542
Regards,
    eMove Moving Help
    www.emove.com
End

---

In the e-mail message shown above, the link to access the review ("http://movinghelp.emove.com/ratejob?cid=90456-12345&email=gct@jmbm.com&id=47690") includes the customer identifier ("cid=90456-12345"), which includes the order number ("90456") and zip code of the customer ("12345"); the e-mail address of the customer ("e-mail=jdoe@mail.com"); and the identifier of the job for which the review that is to be retrieved is associated ("id=47690"). The e-mail message also include the link to view a receipt of the job ("http://movinghelp.emove.com/receipt?cid=90542-12345&email=jdoe@mail.com&id=90542") includes the same information as the link to access the review, with the difference that the identifier relates to the order number versus the job number. A sample receipt is shown in FIG. 7g, which is discussed above. It should be noted that the link to the review may be of various forms, and is not limited to the specific format or type of the uniform resource locator (URL) shown above.

The present invention, by immediately contacting the customer as soon as the vendor retrieves payment for the vendor's services, provides for the maximum likelihood that the customer will submit a review for the service provided by the vendor. The inclusion of a direct link to the review form, without the need for the customer to login (i.e., enter a username and password), locate, and then retrieve the review for the particular job that was performed, reduces the number of operations that the user must engage in to provide feedback down to a single click on the link to the review. Also, as discussed herein, there is a financial incentive for the user to provide feedback. Other incentives, financial or otherwise, may be presented to the customer and the particular form of compensation should be not limited to the ones described herein.

Figure 6:
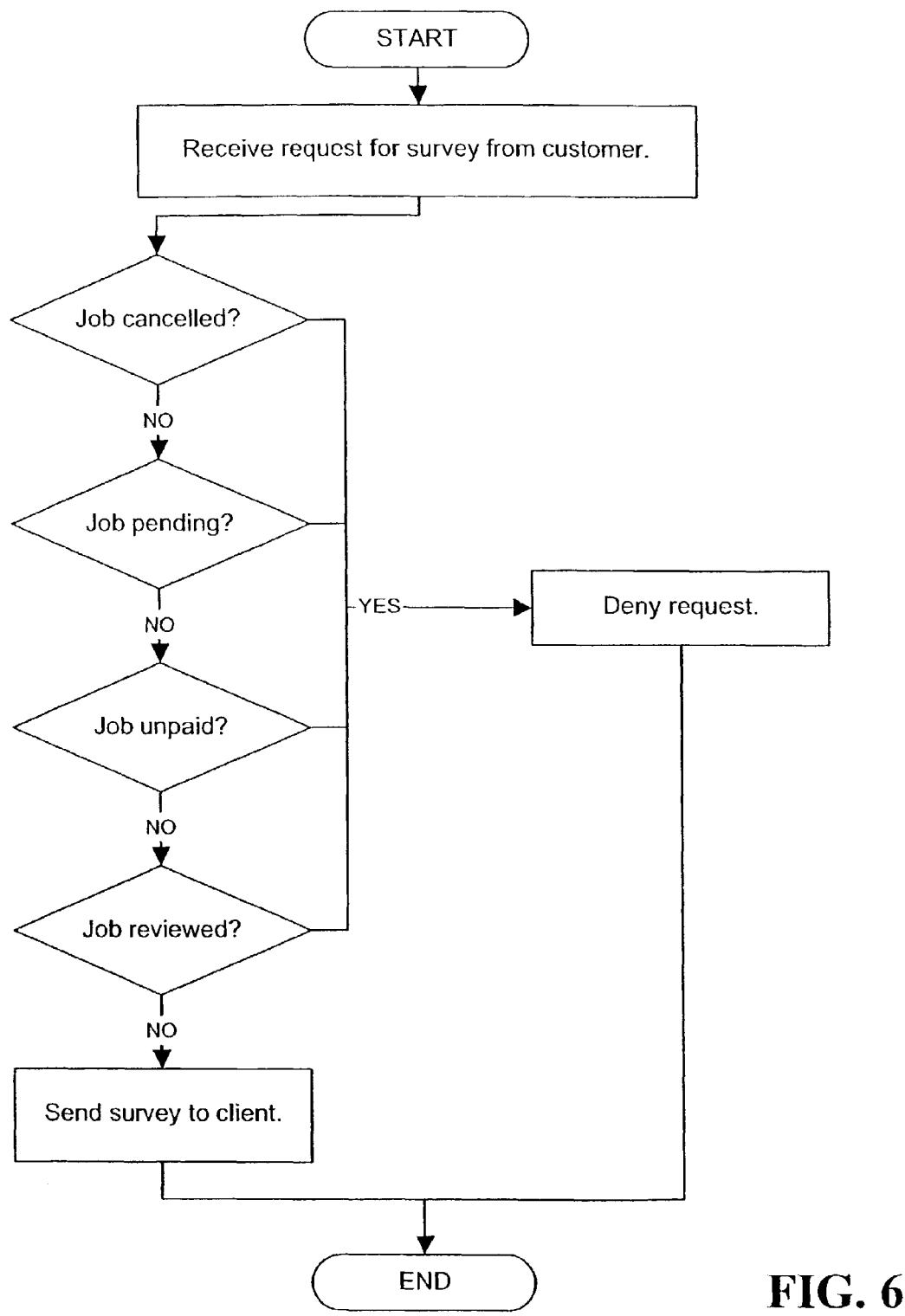
FIG. 6 is a flow diagram illustrating the process of the customer using the online marketplace to retrieve the review referenced in the link sent in the process illustrated by FIG. 5.

FIG. 6 is a flow chart illustrating the process where the customer is retrieving the review using the link provided in the e-mail. In step 602, the system detects a request by the customer to retrieve the review. Based on this request, a series of conditions are tested before the review is transmitted. In the embodiment where the e-mail sent to the customer contains the actual review, the conditions are tested before the customer's response to the review is accepted. These checks are necessary as a review should only be sent to the customer (or the response to the review accepted) if a job has been completed by the vendor (based on detection of the payment request), and if no evaluation has been previously completed by the customer.

It is first determined in step 604 whether the job associated with the review requested by the customer has been cancelled, thereby making any results of the review inapplicable. If the job has not been cancelled, operation continues with step 606, where it is determined if the job is actually pending and not a "completed" job. If the job is determined to not be still pending, operation continues with step 608, where it is determined if payment has been retrieved by the vendor. If the payment has been retrieved, then operation continues with step 610, where it is determined if a review has already been submitted for the job associated with the review. If the job has been paid, operation continues with step 612, where the review is presented to the customer. In the embodiment where the review has been previously transmitted, the response to the review is accepted at this point.

If at anytime none of the conditions described above are met such that sending the review (or receiving the response to the review) is valid (e.g., sending a review or receiving the response for a job that was never completed), the system will proceed with step 614, where the request to retrieve the review (or to send the response) is denied. The system may display an error message with the reason the review is not being transmitted (or the response is not being accepted).

Figure 10A:
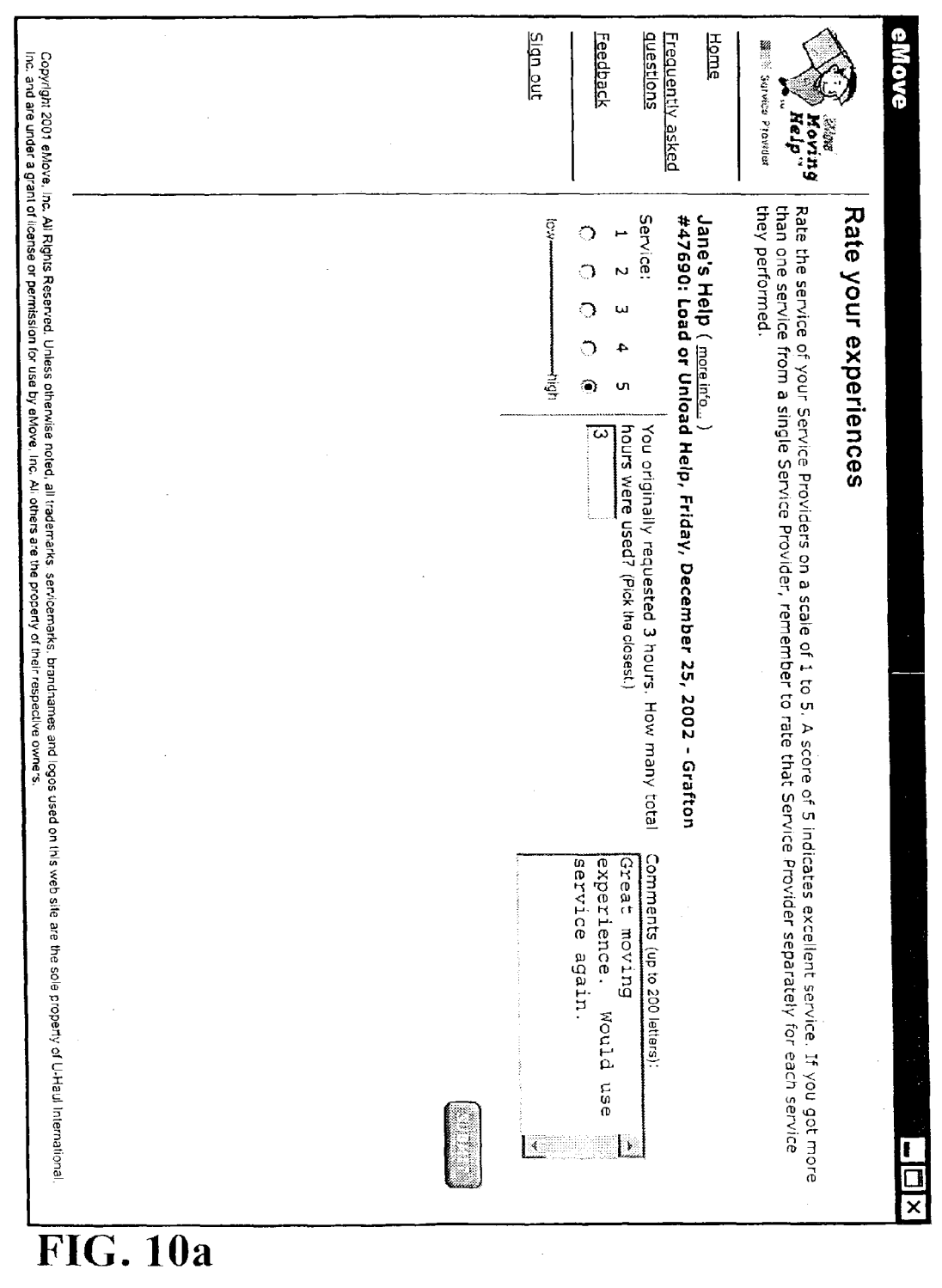

FIG. 10a illustrates a window displaying a review configured in one embodiment of the present invention, where a customer may provide feedback by assigning a numerical rating to the vendor as well as provide written comments. The review also inquires as to how many hours out of the total of the contracted order was actually performed. When the customer has completed the review, the customer may click on the "submit" button to submit the feedback. In the example that is provided, the customer may assign a rating between 1 (lowest rating) and 5 (highest rating).

Figure 10B:

Once the response to the review is received from the customer, the vendor's rating information is updated. In addition, the refundable order handling fee is refunded to the customer, preferably using the same payment mechanism with which the customer originally paid for the services. For example, if the customer paid for the services with a credit card, the refund would be applied to the same credit card. FIG. 10b illustrates the window displaying a "Thank You" message to the customer once the review has been submitted by the customer.

Other actions may be generated by the system based on the ratings received in the review from the customer. For example, if there is an unusually low rating given by the customer, an e-mail may be sent to the customer service department of the company operating the marketplace (i.e., e-move.com) to follow-up with the customer, as well as an e-mail to the vendor notifying them of the low rating and encouraging the vendor to follow-up with the customer as well. Conversely, a high rating would warrant a congratulatory e-mail to the vendor from the company operating the marketplace.

Figure 11:
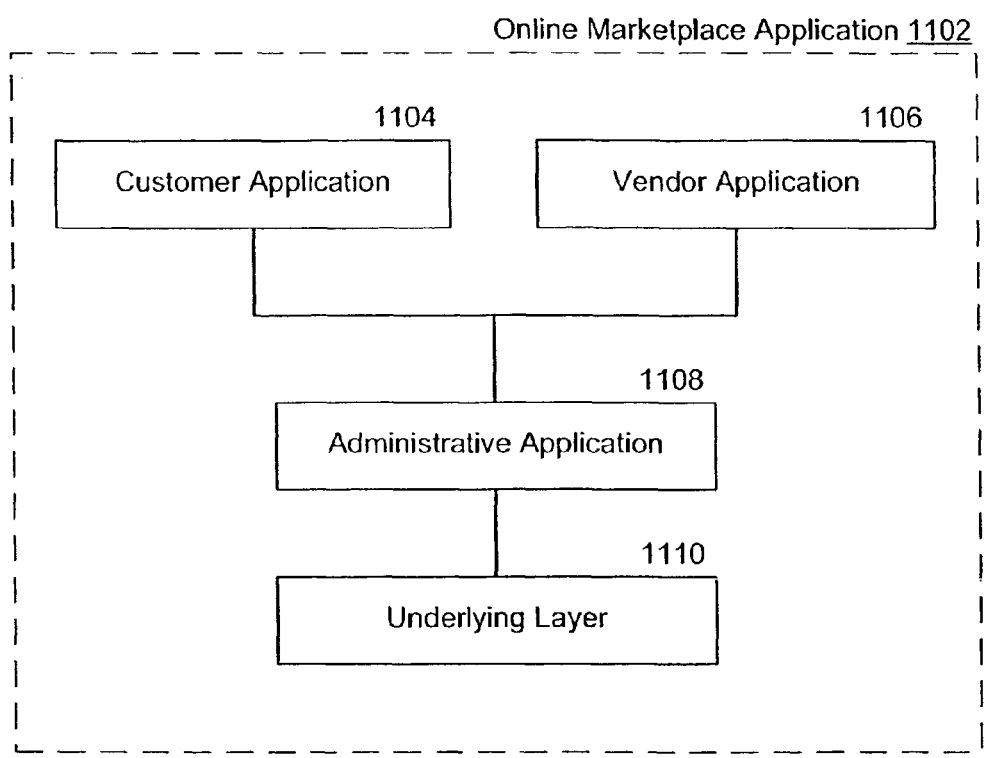
FIG. 11 shows a block diagram of an online marketplace application in accordance with one embodiment of the present invention.

FIG. 11 is a block diagram of an online marketplace application in accordance with one embodiment of the present invention, which is software executing on an emove.com computer server. An online marketplace application 1102 contains four primary software components: a customer application 1104, a vendor application 1106, an administrative application 1108, and an underlying layer 1110. Customer application 1104 allows the customer to navigate through the marketplace with the functionality of the processes described in FIGS. 1, 5 and 6 and provides the customer interface as described above in FIGS. 7a-7g, and 10a-10b. Thus, customer application 1104 provides the functionality of selecting and paying for a service from a particular vendor; and after the service is completed, customer application 1104 provides the functionality for accepting feedback and comments from the customer regarding the vendor. It also allows a customer to review the transactions that have been paid for before and after a job is completed.

Vendor application 1106 provides functionality for vendors to complete necessary tasks such as those described in FIGS. 2-4 for the online marketplace. Initially, vendor application 1106 processes vendors being added to the lists maintained by the host. Vendor application 1106 handles the login process for vendors entering the marketplace and processes payment codes entered by a vendor to transfer money from an escrow account to the vendor's account. Vendor application 1106 also processes scheduling services for the vendors and provides schedules to vendors. Vendor application 1106 provides the user interfaces describe in FIGS. 8a-8c and 9a-9b.

Administrative application 1108 allows an administrator of the online marketplace to oversee the entire application and perform basic administrative functions. A few examples of this include assigning a particular city to a service area or adding a new category of services to the services offered in the marketplace. It also allows an administrator to access data for analysis and creating statistics on customer behavior. Underlying layer 1110 provides the groundwork or foundation for the applications to function. For example, it maps the database containing vendor and customer information, needed by the applications to operate, and determines the overall look and feel of the online marketplace system.

Although the description of the invention is directed to vendors primarily as "service" providers, the mechanisms described above apply to vendors providing "goods" in addition to or instead of services. Thus, the "job" number would be related to a particular purchase of goods and the time would be related to the time of delivery.

Moreover, it is to be noted that although the description contained herein describes an exemplary series of steps executed in a particular order in accordance with one embodiment of the present invention, the sequence of operations may be altered or certain steps may be combined or cancelled in other embodiments of the present invention. Further, certain steps may be further divided in these other embodiments.

The system may also be implemented using a variety of technologies other than the client-server web system described herein. For example, the system may be implemented using a telephone system, where vendors may review job requests; respond to job requests; request payments; retrieve their customer provided ratings and feedback; and otherwise perform the same types of vendor operations using a telephone system as would be performed using the emove.com website. In addition, customers may receive a listing of vendors; review and select vendors for job requests; provide payment information; revise/review job requests; provide feedback and review for a completed job; and otherwise perform the same types of customer operations using a telephone system as would be performed using the emove.com website.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A method for conducting a review comprising the steps of:
    detecting with a computer system a payment request from a vendor, including receiving a payment code from the vendor, wherein the payment code is related to a particular job to be performed by the vendor and is issued to a customer after accepting a payment from the customer for the job;
    activating a payment for the job in response to the vendor entering the payment code;
    generating with the computer system a review based on the payment request; and;
    transmitting with the computer system a reference to the review to the customer;
    wherein the reference provides a link to retrieve the review.

2. The method of claim 1, where the step of transmitting with a computer system the reference to the review to the customer comprises the steps of:
    creating with the computer system an electronic mail message addressed to the customer, the reference to the review contained in the electronic mail message; and,
    transmitting with the computer system the electronic mail message.

3. The method of claim 1, further comprising the steps of:
    detecting with a computer system a request to retrieve the review by the customer; and,
    transmitting with the computer system the review.

4. The method of claim 1, further comprising the steps of:
    detecting with a computer system a response to the review; and,
    updating with the computer system a vendor feedback record based on the response.

5. The method of claim 1, further comprising the steps of:
    detecting with a computer system a response to the review; and,
    generating with the computer system a notification based on the response.

6. A method for conducting a review comprising the steps of:
    detecting with a computer system a payment request from a vendor, including receiving a payment code from the vendor, wherein the payment code is issued to a customer after accepting a payment from the customer for a job to be performed by the vendor;
    activating a payment for the job in response to the vendor entering the payment code;
    generating with the computer system a review based on the payment request;
    transmitting with the computer system a reference to the review to a customer, wherein the reference provides a link to retrieve the review;
    detecting with the computer system a request to retrieve the review by the customer;
    determining with the computer system the status of a job related to the review before transmitting the review; and,
    transmitting with the computer system the review if the status meets a first condition.

7. The method of claim 6, where the first condition is related to the job being completed.

8. The method of claim 6, where the status meets the first condition if a review response has not been previously received.

9. A method for conducting a review comprising the steps of:
- detecting with a computer system a payment request from a vendor, including receiving a payment code from the vendor, wherein the payment code is issued to a customer after accepting a payment from the customer for a job to be performed by the vendor;
- activating a payment for the job in response to the vendor entering the payment code;
- generating with the computer system a review based on the payment request;
- transmitting with the computer system a reference to the review to a customer;
- wherein the reference provides a link to retrieve the review;
- detecting with a computer system a response to the review; and,
- crediting with the computer system the customer with a predetermined amount based on detecting the response to the review.

10. The method of claim 9, wherein the predetermined amount is an amount that was previously paid by the customer.

11. A computer readable medium having a computer readable program code contained therein for conducting a review, the computer readable program code comprising:
- computer readable program code for detecting a payment request from a vendor, including receiving a payment code from the vendor, wherein the payment code is related to a particular job to be performed by the vendor and is issued to a customer after accepting a payment from the customer for the job;
- computer readable program code for activating a payment for the job in response to the vendor entering the payment code;
- computer readable program code for generating a review based on the payment request; and
- computer readable program code for transmitting a reference to the review to a customer, wherein the reference provides a link to retrieve the review.

12. The computer readable medium of claim 11, where the computer readable program code contained therein for transmitting the reference to the review to the customer comprises:
- computer readable program code for creating an electronic mail message addressed to the customer, the reference to the review contained in the electronic mail message; and,
- computer readable program code for transmitting the electronic mail message.

13. The computer readable medium of claim 11, where the computer readable program code contained therein further comprising:
- computer readable program code for detecting a request to retrieve the review by the customer; and,
- computer readable program code for transmitting the review.

14. The computer readable medium of claim 11, where the computer readable program code contained therein for conducting the review further comprising:
- computer readable program code for detecting a response to the review; and,
- computer readable program code for updating a vendor feedback record based on the response.

15. The computer readable medium of claim 11, where the computer readable program code contained therein for conducting the review further comprising:
- computer readable program code for detecting a response to the review; and,
- computer readable program code for generating a notification based on the response.

16. A computer readable medium having a computer readable program code contained therein for conducting a review, the computer readable program code comprising:
- computer readable program code for detecting a payment request from a vendor, including receiving a payment code from the vendor, wherein the payment code is related to a particular job to be performed by the vendor and is issued to a customer after accepting a payment from the customer for the job;
- computer readable program code for activating a payment for the job in response to the vendor entering the payment code;
- computer readable program code for generating a review based on the payment request; and
- computer readable program code for transmitting a reference to the review to a customer, wherein the reference provides a link to retrieve the review;
- where the computer readable program code for transmitting the review comprises:
  - computer readable program code for determining the status of a job related to the review before transmitting the review; and,
  - computer readable program code for transmitting the review if the status meets a first condition.

17. The computer readable medium of claim 16, where the first condition is related to the job being completed.

18. The computer readable medium of claim 16, where the status meets the first condition if a review response has not been previously received.

19. A computer readable medium having a computer readable program code contained therein for conducting a review, the computer readable program code comprising:
- computer readable program code for detecting a payment request from a vendor, including receiving a payment code from the vendor, wherein the payment code is issued to a customer after accepting a payment from the customer for a job to be performed by the vendor;
- computer readable program code for activating a payment for the job in response to the vendor entering the payment code;
- computer readable program code for generating a review based on the payment request; and
- computer readable program code for transmitting a reference to the review to a customer, wherein the reference provides a link to retrieve the review;
- where the computer readable program code for conducting the review further comprises:
  - computer readable program code for detecting a response to the review; and,
  - computer readable program code for crediting the customer with a predetermined amount based on detecting the response to the review.

20. The computer readable medium of claim 19, wherein the predetermined amount is an amount that was previously paid by the customer.

21. A review system comprising:
- a processor; and
- a computer readable memory coupled to the processor, the memory comprising:
  - a vendor application configured to receive a payment request from a vendor including a payment code, wherein the payment code is related to a particular job to be performed by the vendor and is issued to a customer after accepting a payment from the customer for the job; and a customer application configured to activate a payment for the job in response to the vendor entering the payment code and generate a review based on the payment request and transmit a reference to the review to a customer.

22. The review system of claim 21, wherein the processor is coupled to a network, and the customer application is further configured to send an electronic mail message to the customer enclosing the reference to the review using the network.

23. The review system of claim 21, wherein the customer application is further configured to transmit the review to the customer when a request for the review is detected from the customer.

24. The review system of claim 21, wherein the customer application is further configured to detect a response to the review, and update a vendor rating based on the response.

25. A review system comprising:
   a processor; and
   a computer readable memory coupled to the processor, the memory comprising:
   a vendor application configured to receive a payment request from a vendor including a payment code, wherein the payment code is related to a particular job to be performed by the vendor and is issued to a customer after accepting a payment from the customer for the job; and
   a customer application configured to activate a payment for the job in response to the vendor entering the payment code and generate a review based on the payment request and transmit a reference to the review to a customer;
   wherein the customer application is further configured to transmit the review to the customer when a request for the review is detected from the customer; and
   wherein the customer application is further configured to not transmit the review to the customer if a first condition is not met.

26. The review system of claim 25, where the first condition is not met when a job related to the payment request is not completed.

27. The review system of claim 25, wherein the first condition is not met if a review response has previously been received.

28. A review system comprising:
   a processor; and
   a computer readable memory coupled to the processor, the memory comprising:
   a vendor application configured to receive a payment request from a vendor, including receiving a payment code from the vendor, wherein the payment code is issued to a customer after accepting a payment from the customer for a job to be performed by the vendor; and
   a customer application configured to activate a payment for the job in response to the vendor entering the payment code and generate a review based on the payment request and transmit a reference to the review to a customer;
   wherein the customer application is further configured to detect a response to the review, and credit the customer with a predetermined amount based on detecting the response to the review.

29. The review system of claim 28, wherein the predetermined amount is an amount that was previously paid by the customer.

* * * * *